G. ENNIS.
WAGON BRAKE.
APPLICATION FILED JAN. 15, 1908.
910,997.  Patented Jan. 26, 1909.
2 SHEETS—SHEET 1.
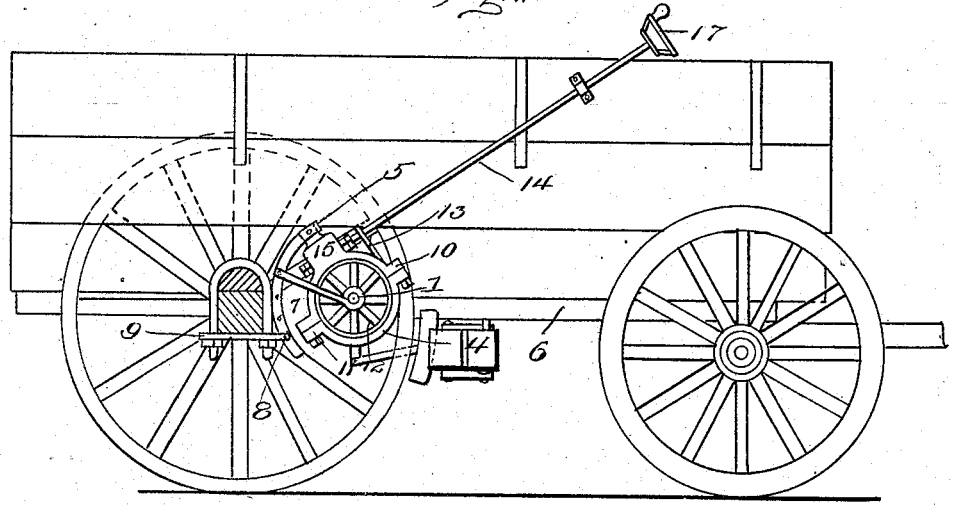
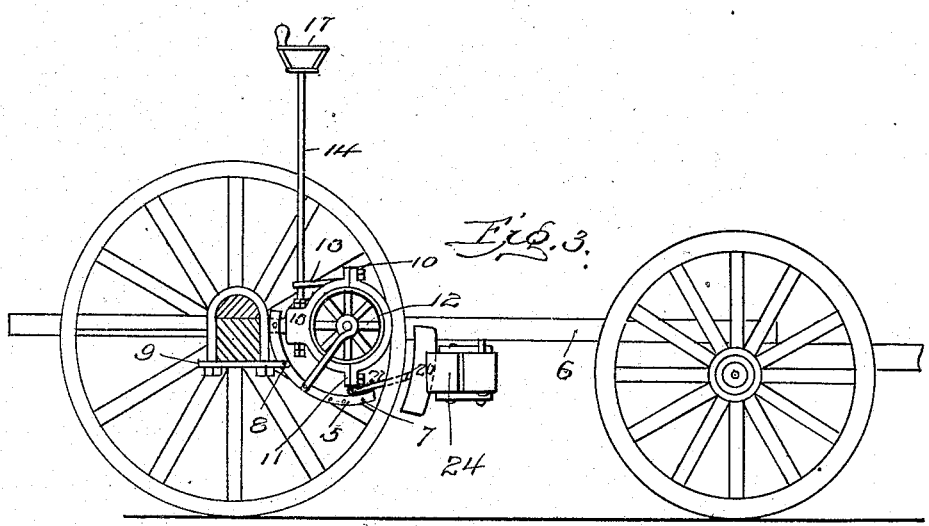
Witnesses
J. M. Fowler Jr.
A. L. Kitchin.
Inventor
General Ennis
By Mason Fenwick & Lawrence
his Attorneys G. ENNIS.
WAGON BRAKE.
APPLICATION FILED JAN. 15, 1908.
910,997.
Patented Jan. 26, 1909.
2 SHEETS—SHEET 2.
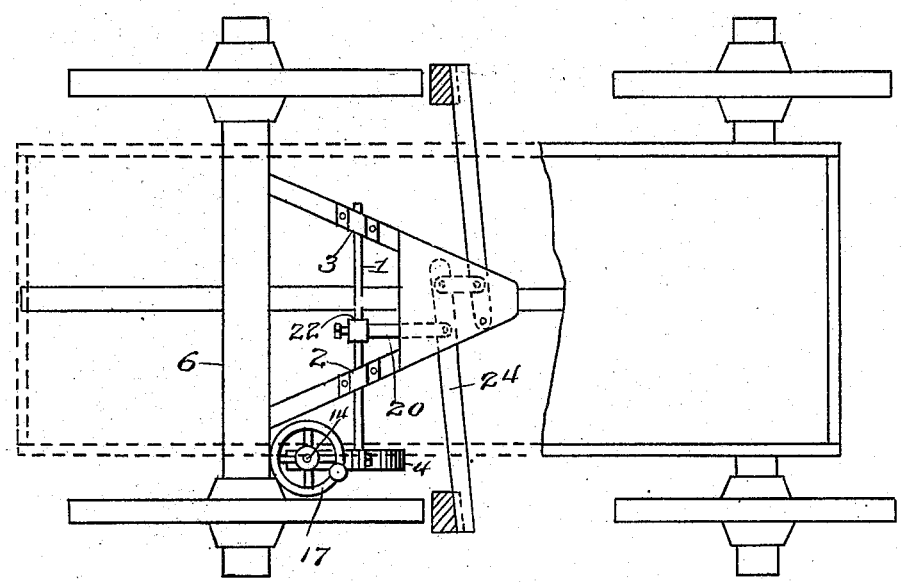
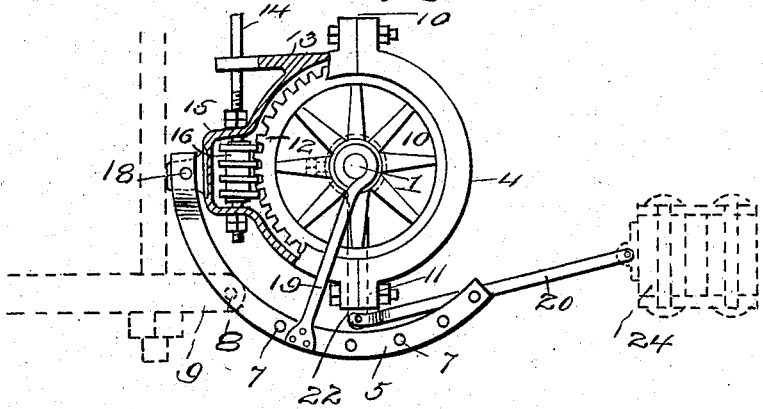

UNITED STATES PATENT OFFICE.

GENERAL ENNIS, OF RIDGEWAY, MISSOURI.

WAGON-BRAKE.

No. 910,997.           Specification of Letters Patent.           Patented Jan. 26, 1909.

Application filed January 15, 1908. Serial No. 410,949.

*To all whom it may concern:*

Be it known that I, GENERAL ENNIS, a citizen of the United States, residing at Ridgeway, in the county of Harrison and State of Missouri, have invented certain new and useful Improvements in Wagon-Brakes; and I do hereby declare the following to be a full, clear, and exact description of the invention, such as will enable others skilled in the art to which it appertains to make and use the same.

This invention relates to improvements in brakes and particularly to wagon brakes and may be used upon, the running gears of a wagon or upon the box or body portion as may be desired.

The invention comprises the provision of an end operating mechanism comprising a worm and gear and means for moving the brake shoes into and out of contact with the wheels of the wagon.

The invention further comprises the provision of a gear and worm therefor, together with an adjustable housing inclosing the same adapted to be variously adjusted for regulating the position of an operating means connected therewith, the same to be used in connection with brake shoes and connecting rods whereby upon the operation of the worm and gear the brake shoes will be moved against the wheels of the wagon or away from the same.

The object in view is the provision of a brake mechanism arranged with an adjustable support or housing for the operating mechanism thereof that may be adjusted for varying the position of the hand wheel arranged to move the operating parts of the brake.

With these and other objects in view, the invention comprises certain novel constructions, combinations and arrangements of parts as will be hereinafter more fully described and claimed.

In the accompanying drawing: Figure 1 is a side elevation of my improved brake mechanism applied to a wagon. Fig. 2 is a top plan of the brake mechanism shown in Fig. 1, the same being shown in connection with a fragmentary view of a wagon. Fig. 3 is a side elevation of my improved brake mechanism applied to the running gear of a wagon having the wagon body removed. Fig. 4, is a side elevation of my improved brake mechanism showing exposed parts.

In constructing the present invention a rotatable shaft 1 is provided and is held in position preferably upon the running gears 6 of a wagon by means of braces 2 and 3 and an adjustable support or housing 4, the housing 4 in turn being supported by a supporting arm 5. The supporting arm 5 is provided with a plurality of openings 7, through which a pin or bolt 8 is designed to be passed. The bolt 8 also passes through a bracket 9 that is rigidly secured to the framework or running gear of the wagon. The housing 4 is formed in a plurality of parts and bolted or otherwise rigidly secured together at 10 and 11 for forming a shield or housing for a worm wheel 12 that is rigidly secured to shaft 1. One of the parts of the frame 4 is provided with an arm 13 designed to receive and guide a shaft 14. Another extension or raised portion 15 is provided for accommodating a worm 16 that meshes with gear wheel 12. The worm 16 is rigidly secured to shaft 14, for instance, by a key, so that when the shaft 14 is turned or revolved by hand wheel 17, gear wheel 12, and shaft 1 will also be turned or rotated. The supporting arm 5 is pivotally mounted at 18 to extension 15 and is also provided with a connecting arm or link 19 which encircles shaft 1 for assisting in supporting the same. The supporting arm 5 assists in supporting shaft 1 but the main use for the same is for regulating the position of worm 16 and the angle at which the same operates together with the angle at which shaft 14 operates. By placing bolt 8 in different apertures 7, hand wheel 17 may be moved on the arc of a circle with shaft 1 as the center so that the same may take the position shown in Fig. 1, or be moved forward or backward as desired and yet successfully rock or rotate shaft 1 which in turn reciprocates connecting link or rod 20. A depending bar or lever 22 is rigidly secured to shaft 1 by any means so that shaft 1 is rocked or rotated that link 20 will be reciprocated for moving brake bar 24 which in turn will cause the brake shoes to engage or be disengaged from the wheels of the wagon.

In applying the brake to a wagon the same may be applied to the box or bed of the wagon or to the running gear, reaches or the like as may be desired. Ordinarily the brake is not applied or secured to the bed or box portion of the wagon so that the brake may be used either with the box or bed in place or removed as may be desired with equal advantage; but in my device, the adjustment is such that the brake may be operated, either with or without the wagon. When used with the wagon-box, rod 14 has an angle, as shown in Fig. 1, with the operating wheel well forward toward the front of the box, so as to be accessible to the driver on the seat (not shown) of the wagon. By the provision of arm 5 for regulating the position of the operating wheel 17 the hand wheel may be raised to a position shown in Fig. 1 when the box or body of the wagon is being used and the hand wheel may be moved to any other position that may be desired when the box is removed and the wagon is used for other purposes as for instance hauling logs as shown in Fig. 3.

A braking device that may be operated either with or without the wagon box, and the operative member of which is accessible at different locations and elevations, and which is adjustable to take those positions at will, is an important feature of a wagon for general use.

What I claim is:

1. The combination of a wagon, a wagon box for the wagon, means to brake the wagon, side attached means connected at the rear of the wagon to the said braking means for swinging the locking shaft and presenting it either at the side and front of the wagon box, or in a side rear position with reference to the wagon.

2. The combination of a wagon, a wagon box, means to brake the wagon, rear-located, side-attached means connected to said braking means for varying the location of the locking shaft, and a rack and pin for adjusting the same.

3. In a wagon, the combination of a braking means, adjustable worm gearing connected with the braking means, a housing for the worm gearing, an operating shaft for operating the adjustable worm gearing, and a rack and pin for holding the adjustable parts in their adjusted position.

In testimony whereof I affix my signature in presence of two witnesses.

GENERAL ENNIS.

Witnesses:
A. L. HUGHES,
G. W. PRYOR.